United States Patent
Chen et al.

(10) Patent No.: US 11,605,087 B2
(45) Date of Patent: Mar. 14, 2023

(54) METHOD AND APPARATUS FOR IDENTIFYING IDENTITY INFORMATION

(71) Applicant: Advanced New Technologies Co., Ltd., Grand Cayman (KY)

(72) Inventors: Tao Chen, Zhejiang (CN); Chao Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/103,186

(22) Filed: Nov. 24, 2020

(65) Prior Publication Data

US 2021/0081950 A1  Mar. 18, 2021

Related U.S. Application Data

(63) Continuation of application No. PCT/CN2019/092482, filed on Jun. 24, 2019.

(30) Foreign Application Priority Data

Aug. 15, 2018  (CN) .......................... 201810927325.2

(51) Int. Cl.
*G06Q 20/40* (2012.01)
*G06Q 20/36* (2012.01)

(52) U.S. Cl.
CPC ..... *G06Q 20/4016* (2013.01); *G06Q 20/3674* (2013.01); *G06Q 20/4014* (2013.01)

(58) Field of Classification Search
CPC ........... G06Q 20/4016; G06Q 20/3674; G06Q 20/4014
See application file for complete search history.

(56) References Cited

U.S. PATENT DOCUMENTS 6,226,408 B1 * 5/2001 Sirosh .................. G06K 9/6223
  382/253
8,108,916 B2 * 1/2012 Fink ..................... G06Q 20/382
  726/6

(Continued)

FOREIGN PATENT DOCUMENTS

CN  104811428 A  7/2015
CN  105389488 A  3/2016

(Continued)

OTHER PUBLICATIONS

"Tax Refund Fraud and Related Identity Theft", Mar. 2012, Available at: https://www.fincen.gov/sites/default/files/advisory/FIN-2012-A005.pdf (Year: 2012).*

(Continued)

*Primary Examiner* — David P Sharvin
*Assistant Examiner* — Gregory Harper
(74) *Attorney, Agent, or Firm* — Finnegan, Henderson, Farabow, Garrett & Dunner, LLP

(57) ABSTRACT

A method for identifying identity information includes: acquiring user data, the user data including identity information and account information of a user; establishing an association relationship between account information and identity information that are bound in the user data, and establishing an association relationship between two pieces of account information having common features in the user data; and determining a risk value of target identity information in the user data according to the established association relationships, and determining, according to the determined risk value, whether the target identity information has a risk of being used fraudulently.

7 Claims, 5 Drawing Sheets

(56) References Cited

U.S. PATENT DOCUMENTS

| | | | | |
|---|---|---|---|---|
| 9,060,012 | B2* | 6/2015 | Eisen | G06Q 20/10 |
| 9,426,170 | B2* | 8/2016 | Srinivasan | H04L 63/1433 |
| 9,762,728 | B1* | 9/2017 | Cox | H04M 3/382 |
| 2004/0205243 | A1* | 10/2004 | Hurvig | H04L 29/12132 709/245 |
| 2005/0239447 | A1* | 10/2005 | Holzman | H04L 63/102 455/414.3 |
| 2007/0204033 | A1* | 8/2007 | Bookbinder | G06Q 10/10 709/224 |
| 2008/0103800 | A1* | 5/2008 | Domenikos | G06Q 30/0185 705/318 |
| 2009/0248560 | A1* | 10/2009 | Recce | G06Q 40/00 705/35 |
| 2009/0265211 | A1* | 10/2009 | May | G06Q 20/403 705/18 |
| 2010/0082446 | A1* | 4/2010 | Hjelm | G06Q 40/04 705/37 |
| 2011/0131208 | A1* | 6/2011 | Goldfarb | G06Q 30/02 707/736 |
| 2011/0142217 | A1* | 6/2011 | Goldfarb | H04M 15/58 379/126 |
| 2012/0137367 | A1* | 5/2012 | Dupont | G06F 21/00 726/25 |
| 2012/0159647 | A1* | 6/2012 | Sanin | H04L 51/32 726/28 |
| 2012/0303348 | A1* | 11/2012 | Lu | G06F 11/079 703/13 |
| 2014/0108453 | A1* | 4/2014 | Venkataraman | G06F 16/24535 707/774 |
| 2014/0195984 | A1* | 7/2014 | Aslam | G06Q 50/265 715/853 |
| 2014/0201048 | A1* | 7/2014 | Lin | G06Q 30/0185 705/35 |
| 2015/0170149 | A1* | 6/2015 | Sharma | G06Q 20/027 705/44 |
| 2015/0264063 | A1* | 9/2015 | Jenson | G06Q 20/384 726/22 |
| 2016/0042355 | A1* | 2/2016 | Wang | G06Q 20/4016 705/39 |
| 2016/0078436 | A1* | 3/2016 | Tomasofsky | G06Q 20/4014 705/44 |
| 2016/0104132 | A1* | 4/2016 | Abbatiello | G06Q 20/386 705/39 |
| 2016/0364794 | A1* | 12/2016 | Chari | G06Q 40/02 |
| 2016/0371309 | A1* | 12/2016 | Morimoto | G06F 16/2228 |
| 2017/0039637 | A1* | 2/2017 | Wandelmer | G06Q 40/025 |
| 2017/0270529 | A1* | 9/2017 | Ebel | G06F 16/24568 |
| 2018/0041479 | A1 | 2/2018 | Wang | |
| 2018/0211718 | A1* | 7/2018 | Heath | G16H 80/00 |
| 2018/0295204 | A1* | 10/2018 | Westphal | H04L 67/10 |
| 2018/0316665 | A1* | 11/2018 | Caldera | H04L 63/08 |
| 2018/0330382 | A1* | 11/2018 | Chen | G06Q 20/382 |
| 2019/0089711 | A1* | 3/2019 | Faulkner | H04L 63/1425 |
| 2019/0122149 | A1* | 4/2019 | Caldera | G06Q 10/0635 |
| 2019/0132224 | A1* | 5/2019 | Verma | H04L 63/1425 |
| 2019/0251583 | A1* | 8/2019 | Mei | G06Q 40/08 |
| 2019/0264916 | A1* | 8/2019 | Unni | G06F 17/15 |
| 2019/0311301 | A1* | 10/2019 | Pyati | G06F 16/901 |
| 2019/0311367 | A1* | 10/2019 | Reddy | G06N 20/00 |

FOREIGN PATENT DOCUMENTS

| | | |
|---|---|---|
| CN | 106034149 A | 10/2016 |
| CN | 107018000 A | 8/2017 |
| CN | 107018115 A | 8/2017 |
| CN | 107846393 A | 3/2018 |
| CN | 108108866 A | 6/2018 |
| CN | 108399532 A | 8/2018 |
| CN | 108830731 | * 11/2018 |

OTHER PUBLICATIONS

"Accelerating Graph Betweenness Centrality with CUDA", Jul. 23, 2014. Available at: https://developer.nvidia.com/blog/accelerating-graph-betweenness-centrality-cuda/ (Year: 2014).*

"Director Networks and Credit Ratings", Apr. 2018. Available at: https://pdxscholar.library.pdx.edu/cgi/viewcontent.cgi?article=1145&context=busadmin_fac (Year: 2018).*

Trabajo et al., "On dynamic network security: A random decentering algorithm on graphs", Jun. 22, 2018. Available at: https://www.degruyter.com/document/doi/10.1515/math-2018-0059/html (Year: 2018).*

International Search Report in Application No. PCT/CN2019/092482, from the China National Intellectual Property Administration (ISA/CN), dated Sep. 3, 2019.

Written Opinion of the International Search Authority in International Application No. PCT/CN2019/092482, dated Sep. 3, 2019.

Extended European Search Report in Application No. 19849124.3, dated Aug. 11, 2021.

Examination Report of Indian Application No. 202037047544, dated Aug. 10, 2021.

Written Opinion and Search Report for Singapore Application No. 11202010698W, dated Oct. 17, 2022.

Office Communication on Intention to Grant a Patent in European Application No. 19849124.3, dated Nov. 2, 2022.

* cited by examiner

METHOD AND APPARATUS FOR IDENTIFYING IDENTITY INFORMATION

CROSS-REFERENCE TO RELATED APPLICATIONS

This application is a continuation application of International Application No. PCT/CN2019/092482, filed on Jun. 24, 2019, which is based upon and claims priority to Chinese Patent Application No. 201810927325.2, filed on Aug. 15, 2018, the entire content of all of which is incorporated herein by reference.

TECHNICAL FIELD

Embodiments of this specification relate to the field of Internet technologies, and in particular, to a method and an apparatus for identifying identity information.

BACKGROUND

With the continuous development of Internet technologies, the problem of information security in a network has become increasingly prominent. At present, identity information of a user may be stolen by an illegal user. The illegal user may use the stolen identity information to register an account, and use the registered account to perform various illegal operations, thereby bringing undesirable consequences to the user.

Currently, whether identity information is used fraudulently by others can usually be determined according to a usage environment of an account. For example, if an account is authenticated on the same device as a large number of other accounts, the identity information corresponding to the account is likely used fraudulently by others. However, if the usage environment of the account changes, this method may not effectively identify the identity information that is used fraudulently. Therefore, there is an urgent need for an effective method for identifying identity information.

SUMMARY

According to a first aspect of embodiments of the specification, a method for identifying identity information comprises: acquiring user data, the user data comprising identity information and account information of a user; establishing an association relationship between account information and identity information that are bound in the user data, and establishing an association relationship between two pieces of account information having common features in the user data; and determining a risk value of target identity information in the user data according to the established association relationships, and determining, according to the determined risk value, whether the target identity information has a risk of being used fraudulently.

According to a second aspect of embodiments of the specification, an apparatus for identifying identity information comprises: a processor; and a memory storing instructions executable by the processor, wherein the processor is configured to: acquire user data, the user data comprising identity information and account information of a user; establish an association relationship between account information and identity information that are bound in the user data, and establish an association relationship between two pieces of account information having common features in the user data; and determine a risk value of target identity information in the user data according to the established association relationships, and determine, according to the determined risk value, whether the target identity information has a risk of being used fraudulently.

According to a third aspect of embodiments of the specification, a non-transitory computer-readable storage medium has stored therein instructions that, when executed by a processor of a device, cause the device to perform a method for identifying identity information, the method comprising: acquiring user data, the user data comprising identity information and account information of a user; establishing an association relationship between account information and identity information that are bound in the user data, and establishing an association relationship between two pieces of account information having common features in the user data; and determining a risk value of target identity information in the user data according to the established association relationships, and determining, according to the determined risk value, whether the target identity information has a risk of being used fraudulently.

In the embodiments of the specification, after user data to be analyzed is acquired, association relationships between identity information and account information and between account information and account information in the user data may be established. The association between identity information and account information here can be reflected in that: the account information is registered or authenticated based on the associated identity information; and the association between different pieces of account information can be reflected in that: two pieces of account information have common features. Further, the two pieces of account information having common features may include, for example, the two pieces of account information having an interaction behavior, the two pieces of account information being bound to the same object, and the two pieces of account information being logged-in on the same device. Generally speaking, among multiple pieces of account information associated with the same identity information, there are often two or more pieces of account information having common features. For example, when a user uses multiple accounts created by the user, some of these accounts may be logged-in on the same device, and transferring money, assisting authentication, being bound to the same mobile phone, etc. may also occur in some accounts, thus making these accounts have common features. If identity information of the user is fraudulently used, the account created by the fraudster based on the identity information of the user usually does not have or rarely has common features with other accounts of the user. In this way, by analyzing the associations between identity information and account information and between account information and account information in data of the user, a risk value of a certain piece of target identity information can be determined. If the risk value is higher than a specified threshold, it can be considered that there is a risk of fraudulent use of the target identity information. The method provided by the embodiments of the specification analyzes the association between identity information and account information to determine whether the identity information is fraudulently used. Even if a fraudster changes an usage environment of an account, the method can still identify whether the account is in an abnormal state based on whether there are common features between the account and other accounts, thereby improving the efficiency of identifying identity information.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Figure 1:
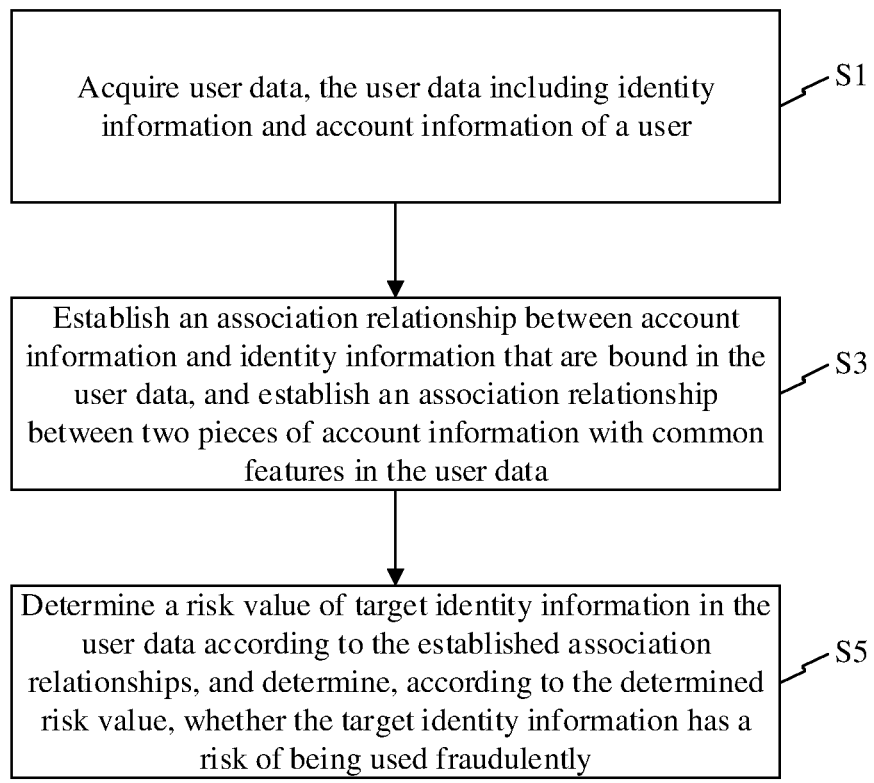
FIG. 1 is a flowchart of a method for identifying identity information according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

FIG. 1 is a flowchart of a method for identifying identity information according to an embodiment. Referring to FIG. 1, the method may include the following steps.

In step S1, user data is acquired, the user data including identity information and account information of a user.

In an embodiment, the user data may be data to be analyzed, and the user data may be acquired from background servers of various websites. The user data may include account information. For example, the account information may be an account name registered by the user, or a digital ID of the account name in a website. The user can fill in the user's own identity information when registering an account, or perform identity authentication after registering an account. In this way, registered account information and authenticated identity information can be bound in the background server of the website. The identity information may be information that can uniquely represent the user's identity, such as ID card information, passport information, medical insurance card information, and driver's license information.

In step S3, an association relationship between account information and identity information that are bound in the user data is established, and an association relationship between two pieces of account information having common features in the user data is established.

In an embodiment, the bound account information and identity information in the user data may represent that the account information is authenticated by the identity information, and therefore, the bound account information and identity information may have an association. In addition, different pieces of account information may have common features during use. The common features can be embodied in many ways. For example, if there is an interaction behavior between two pieces of account information, it can be considered that the two pieces of account information have common features. The interaction behavior may be transferring money to each other, sending chat information, or paying/collecting the same money together. For another example, if two pieces of account information are bound to the same object, it can also be considered that the two pieces of account information have common features. Being bound to the same object may include that the two pieces of account information are bound to the same delivery address, bound to the same mobile phone number, bound to the same email address, etc. For another example, if two pieces of account information are logged-in on the same device, it can also be considered that the two pieces of account information have common features. The above-described examples are not exhaustive. Two pieces of account information having common features may also involve other more situations, which is not limited in the embodiment.

Figure 2:
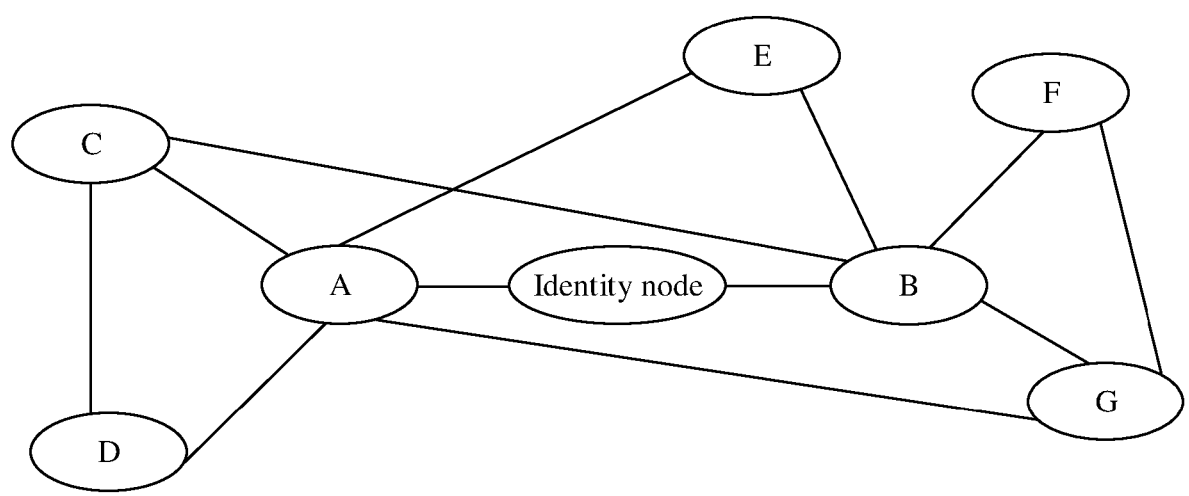
FIG. 2 is a relationship diagram corresponding to a normal user according to an embodiment.

In an embodiment, an association relationship between account information and identity information that are bound in the user data may be established, and an association relationship between two pieces of account information having common features in the user data may be established. For example, in order to visualize the association relationships, the association relationships between account information and identity information and between account information and account information may be indicated in the form of a relationship diagram, as shown in FIG. 2. In the relationship diagram, account information and identity information may be represented by account nodes and an identity node, respectively, and there is a connection line between an account node and the identity node that are bound together, and there is also a connection line between two account nodes having common features. In this way, each piece of information in the user data is represented by using a node, and after adding connection lines between associated nodes, a relationship diagram corresponding to the user data can be established.

Referring back to FIG. 1, in step S5, a risk value of target identity information in the user data is determined according to the established association relationships, and it is determined, according to the determined risk value, whether the target identity information has a risk of being used fraudulently.

In an embodiment, after association relationships between various pieces of information are established in the user data, the established association relationships can be analyzed to obtain a difference between a normal user and an identity fraudster, and identity information that may be at risk of being used fraudulently is identified based on the difference obtained by the analysis. For example, taking the relationship diagram shown in FIG. 2 as an example, a relationship diagram of identity information and account information of a normal user is shown in FIG. 2. In FIG. 2, the identity information of the user is represented by an identity node, and account information of the user is represented by an account node. For example, the user authenticates account information A and account information B through the user's own identity information. Therefore, connection lines are established between the identity node and each of account node A and account node B. In addition, there has been a transfer behavior between account information A and account information C, and account information A and account information D have been logged-in on the same device. In addition, account information C and account information D are bound to the same delivery address. Therefore, according to the above common features, a connection line can be established between the node of account information A and the node of account information C, a connection line can be established between the node of account information A and the node of account information D, and a connection line can be established between the node of account information C and the node of account information D. Similarly, connection lines between other account nodes can be established based on common features. It can be seen from FIG. 2 that although the user created two different accounts, corresponding to account information A and account information B, using the user's own identity information, these two accounts likely have common features with another identical account because these two accounts are used by the user. In the relationship diagram, it can be expressed that there is also an association relationship between respective account groups associated with the two accounts.

Figure 3:
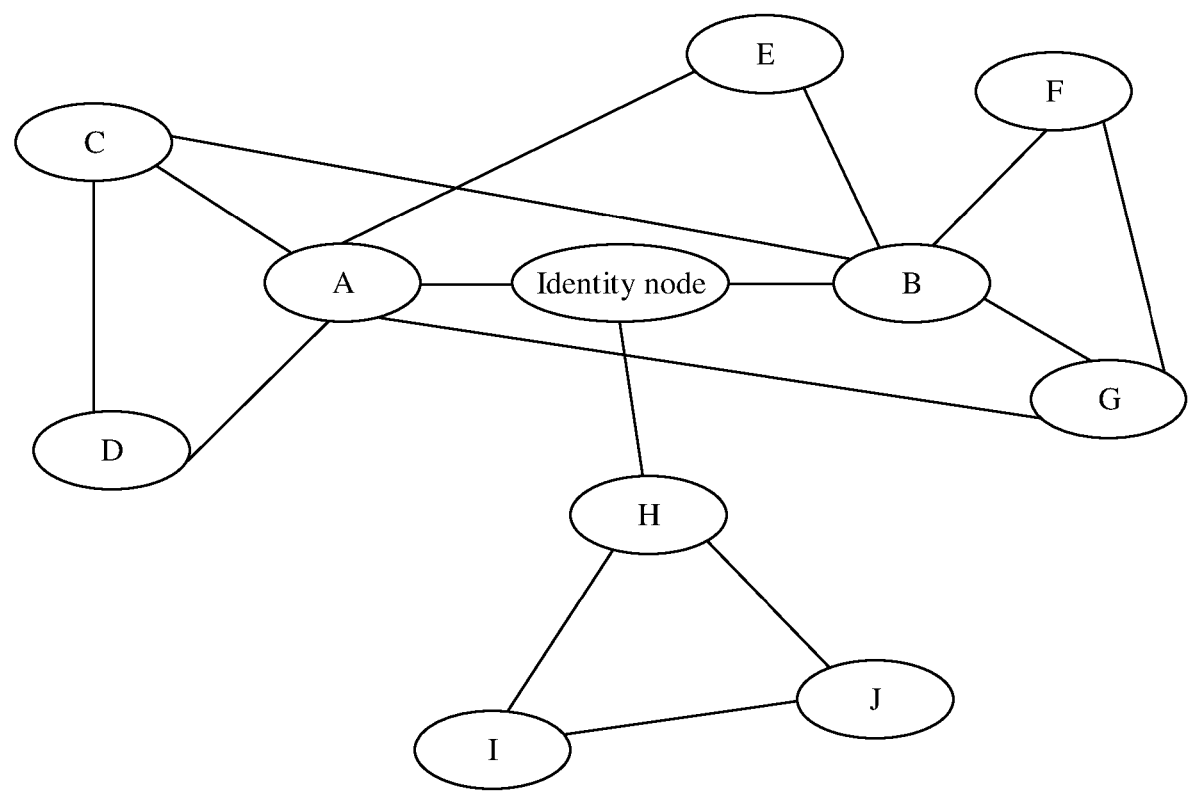
FIG. 3 is a relationship diagram including fraudulently used account information according to an embodiment.

FIG. 3 is a relationship diagram including fraudulently used account information according to an embodiment. Referring to FIG. 3, assuming that the identity information of the user in FIG. 2 is used fraudulently, the fraudster creates account information H using the identity information of the user, and uses account information H to transfer money with two other pieces of account information I and J, respectively. Then, because the fraudster and the user are two different subjects, there is probably no intersection between relationship networks of the two different subjects, which can be reflected in the relationship diagram as follows: there is usually no association between an account group where the account information used by the fraudster is located and an account group where the account information used by the user.

As can be seen from the above, in the relationship diagram, there is a difference between account information created by a normal user and account information created by a fraudster based on identity information of the normal user. In an embodiment, a shortest path between different account nodes can be used to quantify the difference. For example, among paths connecting a first account node and a second account node in the relationship diagram, a path including the fewest connection lines may be used as the shortest path between the first account node and the second account node. For example, various paths connecting account node C and account node B in FIG. 3 may include at least a plurality of paths such as a path from C to B, a path from C to D to A to an identity node to B, and a path from C to A to the identity node to B. Among these paths, the path having the fewest connection lines is the path from C to B, which contains only one connection. Therefore, the shortest path for connection between account node C and account node B is the path from C to B directly. For another example, the shortest path from account node A to account node I should be the path from A to the identity node to H to I, which contains 3 connection lines. It can be seen that the identity node may be included in some shortest paths (such as the shortest path between A and I), or may not be included in some shortest paths (such as the shortest path between C and B). It can be found from the relationship diagram that, for multiple pieces of account information created by the user, in an account group associated with the account information, the shortest paths between different account nodes may probably not include the identity node of the user. For example, in FIG. 3, all the shortest paths from node C to node B, from node C to node F, from node G to node A, and from node E to node A do not include the identity node. However, in an account group associated with the account information created by the fraudster, if an account node in the account group wants to generate a shortest path with an account node in the account group associated with the user, the shortest path generated often includes the identity node of the user. For example, the shortest path from account node H, I, or J to any one of account nodes A to G in FIG. 3 respectively includes the identity node. It can be seen that if the identity information of the user is not used fraudulently, the identity node corresponding to the identity information of the user will not be included in a large number of shortest paths. However, if the identity information of the user is used fraudulently, the identity node corresponding to the identity information of the user will be included in a large number of shortest paths.

Based on the above difference, a risk value of a target identity node in the relationship diagram can be calculated. The target identity node may be an identity node currently to be analyzed. When the risk value of the target identity node is calculated, in the established relationship diagram, the number of the shortest paths where a target identity node representing the target identity information is located may be counted, and the total number of the shortest paths in the relationship diagram may be counted. Then, a ratio of the number of the shortest paths where the target identity node is located to the total number of the shortest paths may be determined as the risk value of the target identity information. It can be seen that a larger number of the shortest paths where the target identity node is located corresponds to a higher risk value. In this way, it can be determined based on the determined risk value whether the target identity information has a risk of being used fraudulently. For example, the determined risk value may be compared with a specified threshold, and if the determined risk value is greater than the specified threshold, it is determined that the target identity information has a risk of being used fraudulently. The specified threshold may be a value obtained through calculation for relationship diagrams of a large number of normal users. For example, a ratio of the number of the shortest paths where an identity node is located to the total number calculated based on a relationship diagram of a normal user is usually not higher than 0.4, then 0.4 or 0.4 added with a certain redundancy value can be used as the specified threshold. A value of the specified threshold may be set flexibly according to an actual application scenario, which is not limited in this specification.

In an embodiment, all identity nodes appearing in a relationship diagram can be processed in the above manner, so as to screen out identity information that has a risk of being used fraudulently. For the identity information with a risk of being used fraudulently, various pieces of account information bound to the identity information with a risk of being used fraudulently can be extracted from the user data. Then, the various pieces of account information may be analyzed one by one, so as to screen out suspicious account information that may be created by a fraudster. When screening suspicious account information, it can be determined whether current account information is simultaneously authenticated on the same device as a large amount of other account information. If so, the current account information may be suspicious account information created by the fraudster. For example, for the current account information in the account information bound to the target identity information, an authentication device corresponding to the current account information may be determined according to a historical operation record of the current account information. Then, historical authentication information generated by the authentication device can be searched, and the quantity of accounts authenticated in the authentication device can be counted from the historical authentication information. If the counted quantity is greater than or equal to a specified quantity threshold, it can be determined that the current account information is suspicious account information. The specified quantity threshold can be set flexibly according to an actual situation. For example, an average quantity of authentications of normal authentication devices can be counted, and then the average quantity of authentications or the average quantity of authentications added with a certain redundancy value is used as the specified quantity threshold.

Figure 4:
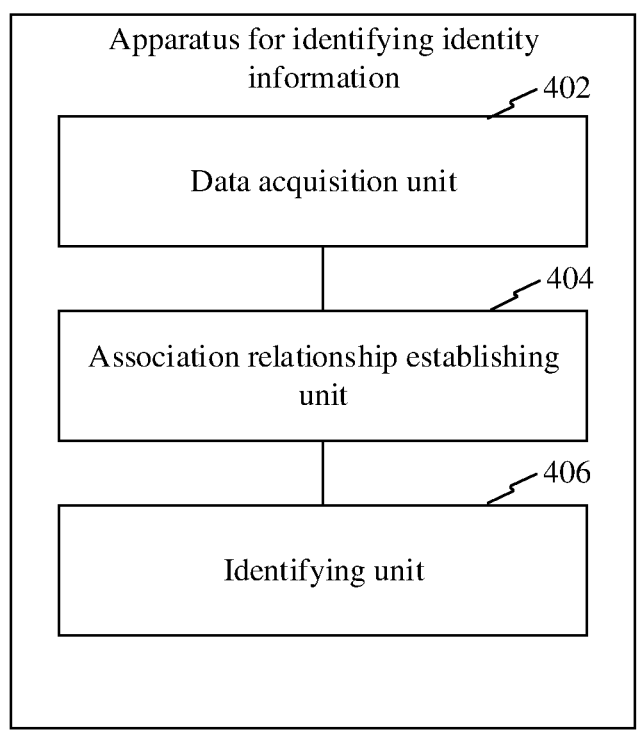
FIG. 4 is a block diagram of an apparatus for identifying identity information according to an embodiment.

FIG. 4 is a block diagram of an apparatus for identifying identity information according to an embodiment. Referring to FIG. 4, the apparatus for identifying identity information may include: a data acquisition unit 402 configured to acquire user data, the user data including identity information and account information of a user; an association relationship establishing unit 404 configured to establish an association relationship between account information and identity information that are bound in the user data, and establish an association relationship between two pieces of account information having common features in the user data; and an identifying unit 406 configured to determine a risk value of target identity information in the user data according to the established association relationships, and determine, according to the determined risk value, whether the target identity information has a risk of being used fraudulently.

In an embodiment, the association relationship establishing unit 404 includes: a relationship diagram establishing module configured to establish a relationship diagram corresponding to the user data, wherein the relationship diagram includes an identity node for representing identity information in the user data and account nodes for representing account information in the user data, wherein there is a connection line between an account node and the identity node that are bound, and there is a connection line between two account nodes having common features.

In an embodiment, among paths connecting a first account node and a second account node in the relationship diagram, a path including the fewest connection lines is used as the shortest path between the first account node and the second account node; and correspondingly, the identifying unit 406 includes: a shortest path counting module configured to, in the established relationship diagram, count the number of the shortest paths where a target identity node representing the target identity information is located, and count the total number of the shortest paths in the relationship diagram; and a ratio calculation module configured to determine a ratio of the number of the shortest paths where the target identity node is located to the total number of the shortest paths as the risk value of the target identity information.

In an embodiment, the identifying unit 406 includes: a threshold comparison module configured to compare the determined risk value with a specified threshold, and if the determined risk value is greater than the specified threshold, determine that the target identity information has a risk of being used fraudulently.

In an embodiment, the apparatus further includes: a suspicious account screening unit configured to extract account information bound to the target identity information from the user data if the target identity information has a risk of being used fraudulently, and screen suspicious account information out from the account information bound to the target identity information.

In an embodiment, the suspicious account screening unit includes: an authentication device determining module configured to, for current account information in the account information bound to the target identity information, determine an authentication device corresponding to the current account information; and an authentication quantity counting module configured to count the quantity of accounts authenticated in the authentication device, and if the counted quantity is greater than or equal to a specified quantity threshold, determine the current account information as suspicious account information.

Figure 5:
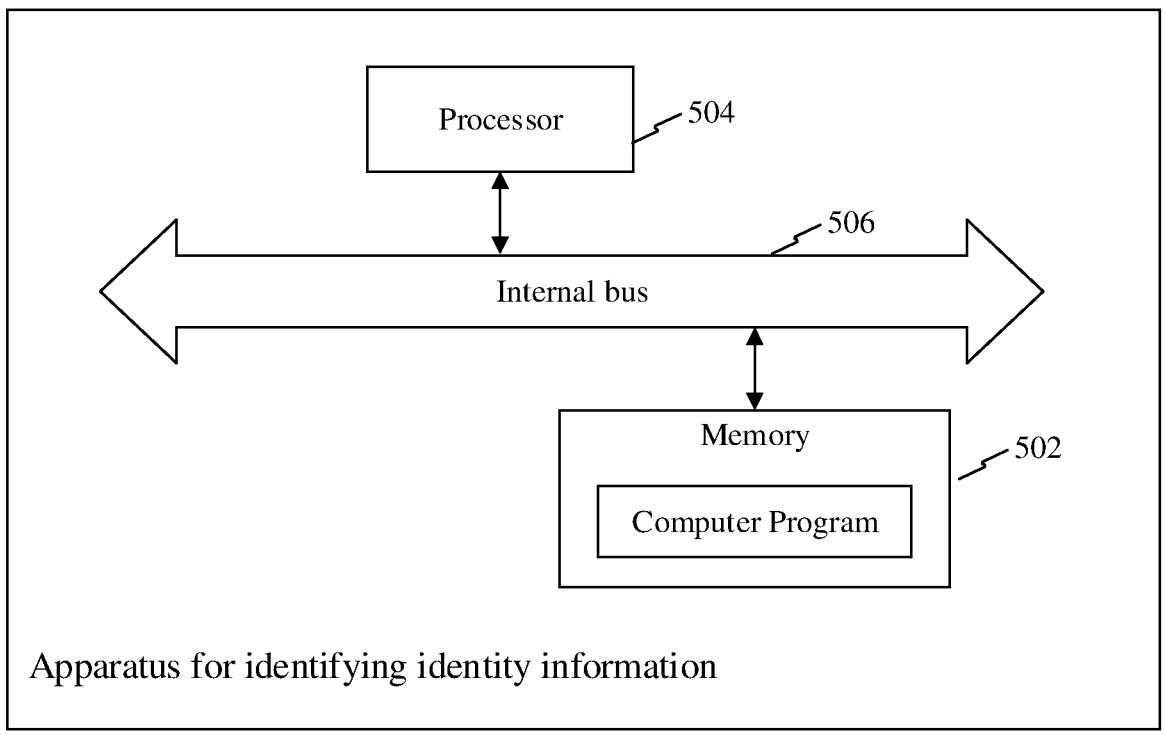
FIG. 5 is a block diagram of an apparatus for identifying identity information according an embodiment.

FIG. 5 is a block diagram of an apparatus for identifying identity information according to an embodiment. Referring to FIG. 5, the apparatus for identifying identity information may include a memory 502 and a processor 504, the memory 502 being coupled to the processor 504 through an internal bus 506. The memory 502 is configured to store a computer program. When executed by the processor 504, the computer program implements the method for identifying identity information described above. The memory 502 may include a memory and a non-volatile memory. The processor 504 reads a corresponding computer program from the non-volatile memory into the memory and runs the computer program. Those of ordinary skill in the art will understand that the structure shown in FIG. 5 is merely illustrative, which does not limit a structure of the apparatus for identifying. For example, the apparatus for identifying may further include more or fewer components than those shown in FIG. 5. For example, it may also include other processing hardware, such as a Graphics Processing Unit (GPU), a display, an input/output interface, a network interface, or have a configuration different from that shown in FIG. 5.

In an embodiment, the processor 504 may include a central processing unit (CPU) or a graphics processor (GPU), and may also include other single-chip microcomputers, logic gate circuits, integrated circuits, etc. with logic processing capabilities, or an appropriate combination thereof. The memory 502 may be a memory device for saving information. In a digital system, a device that can save binary data may be a memory. In an integrated circuit, a circuit that has a storage function but does not have a physical form may also be a memory, such as a RAM and a FIFO. In the system, a storage device in a physical form may also be referred to as a memory, etc. During implementation, the memory 502 may also be implemented in the form of a cloud memory. The specific implementation is not limited in this specification.

It should be noted that the apparatus described in the embodiments of this specification may also include other implementations according to the description of the related method embodiments. For a specific implementation, reference may be made to the description of the method embodiments, and details are not repeated herein.

As described above, after user data to be analyzed is acquired, association relationships between identity information and account information and between account information and account information in the user data may be established. The association between identity information and account information here can be reflected in that: the account information is registered or authenticated based on the associated identity information; and the association between different pieces of account information can be reflected in that: two pieces of account information have common features. Further, the two pieces of account information having common features may include, for example, the two pieces of account information having an interaction behavior, the two pieces of account information being bound to the same object, and the two pieces of account information being logged-in on the same device. Generally speaking, among multiple pieces of account information associated with the same identity information, there are often two or more pieces of account information having common features. For example, when a user uses multiple accounts created by the user, some of these accounts may be logged-in on the same device, and transferring money, assisting authentication, being bound to the same mobile phone, etc.

may also occur in some accounts, thus making these accounts have common features. If identity information of the user is fraudulently used, the account created by the fraudster based on the identity information of the user usually does not have or rarely has common features with other accounts of the user. In this way, by analyzing the associations between identity information and account information and between account information and account information in data of the user, a risk value of a certain piece of target identity information can be determined. If the risk value is higher than a specified threshold, it can be considered that there is a risk of fraudulent use of the target identity information. The method provided by one or more of the embodiments of this specification analyzes the association between identity information and account information to determine whether the identity information is fraudulently used. Even if a fraudster changes an usage environment of an account, the method can still identify whether the account is in an abnormal state based on whether there are common features between the account and other accounts, thereby improving the efficiency of identifying identity information.

The processes depicted in the accompanying drawings do not necessarily require the particular order or sequential order shown to achieve the desired results. In certain implementations, multitasking and parallel processing are also possible or may be advantageous. The sequence of steps listed in the embodiments is only one way in many execution sequences of steps, and does not represent a unique execution sequence. An apparatus or client terminal product may perform the steps sequentially or in parallel based on, for example, a parallel processor or a multi-thread processing environment.

With the development of technologies, improvements to method procedures at present can be considered as direct improvements to hardware circuit configurations. Almost all designers program improved processes into hardware circuits to obtain corresponding hardware circuit configurations. Therefore, improvement to a process can be implemented by a hardware entity module. For example, a Programmable Logic Device (PLD) (e.g., a Field Programmable Gate Array (FPGA)) is such an integrated circuit, and its logic functions are determined by a user through programming the device. Designers may integrate a digital system onto a piece of PLD by independent programming without asking a chip manufacturer to design and manufacture a dedicated integrated circuit chip. Moreover, at present, instead of manually making an integrated circuit chip, this programming may also implemented using logic compiler software, which is similar to a software compiler used for program development and compilation. The original code before compilation may need to be compiled using a specific programming language, such as a Hardware Description Language (HDL). There are different kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should understand that a hardware circuit for implementing a logic method procedure can be obtained by slightly logically programming the method procedure using the above several hardware description languages and programming it into an integrated circuit.

The apparatus, modules, or units illustrated in the foregoing embodiments can be implemented by a computer chip or an entity, or implemented by a product having a certain function. A typical implementation device is a computer. For example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various units based on functions, and the units are described separately. Each of the above described units and modules can be implemented in software, or hardware, or a combination of software and hardware. In some embodiments, the above described method may be implemented in the form of a computer program product implemented on one or more computer-usable storage media (including, but not limited to, a magnetic disk memory, a CD-ROM, an optical memory, and the like) including computer usable program code.

The embodiments are described above with reference to flowcharts and/or block diagrams of the method and the device (apparatus). It should be understood that computer program instructions may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor, or a processor of another programmable data processing device to generate a machine, such that instructions executed by the computer or the processor of another programmable data processing device generate an apparatus configured to implement functions designated in one or more processes in a flowchart and/or one or more blocks in a block diagram.

The computer program instructions may be stored in a computer-readable storage medium that can guide a computer or another programmable data processing device to work in a specific manner. The computer program instructions may also be loaded to a computer or another programmable data processing device, such that a series of operation steps are executed on the computer or another programmable device to perform the above described method.

The computer-readable storage medium includes non-volatile and volatile media as well as movable and non-movable media, and can implement information storage by means of any method or technology. The information can be a computer-readable instruction, a data structure, a module of a program, or other data. Examples of the storage medium of a computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage, graphene storage, or other magnetic storage devices, or any other non-transmission medium, and can be used to store information accessible to a computing device. The computer-readable medium does not include transitory media, such as a modulated data signal and a carrier.

In some embodiments, the method described above can be implemented with a computer-executable instruction executed by a computer, for example, a program module. Generally, the program module includes a routine, a program, an object, an assembly, a data structure, and the like used for executing a specific task or implementing a specific abstract data type. In some embodiments, the method described above can also be implemented in distributed computing environments. In the distributed computing environments, a task is executed by using a remote processing device connected via a communication network. In the distributed computing environments, the program module may be located in local and remote computer storage media including a storage device.

Although the present specification has been described with reference to the embodiments, those of ordinary skills in the art will understand that the present specification has many variations and changes without departing from the spirit of the present specification, and the appended claims cover these variations and changes.

The invention claimed is:

1. A method for identifying identity information, comprising:
acquiring, by a processor, user data from a server of a website, the user data comprising identity information and account information of a user;
based on a computer-implemented relationship diagram, establishing, by the processor, an association relationship between account information and identity information that are bound in the user data, and establishing, by the processor, an association relationship between two pieces of account information having common features in the user data, wherein the establishing the association relationship comprises establishing the relationship diagram corresponding to the user data, wherein the relationship diagram comprises an identity node for representing the identity information in the user data and account nodes for representing the account information in the user data, and the relationship diagram comprises a connection line between an account node and the identity node that are bound, and a connection line between two account nodes having common features;
determining, by the processor, a risk value of target identity information in the user data according to the established association relationships, and comparing, by the processor, the determined risk value with a specified threshold;
in response to the determined risk value being greater than the specified threshold, determining by the processor, for current account information in account information bound to the target identity information, an authentication device corresponding to the current account information; and
determining, by the processor, a quantity of accounts authenticated in the authentication device, and in response to the determined quantity of accounts authenticated in the authentication device being greater than or equal to a specified quantity threshold, determining, by the processor, the current account information as suspicious account information;
wherein among paths connecting a first account node and a second account node in the relationship diagram, a path comprising fewest connection lines is used as a shortest path between the first account node and the second account node; and the determining the risk value of target identity information in the user data comprises:
counting, in the established relationship diagram, a number of shortest paths where a target identity node representing the target identity information is located, and counting a total number of shortest paths in the relationship diagram; and
determining a ratio of the number of the shortest paths where the target identity node is located to the total number of the shortest paths in the relationship diagram as the risk value of the target identity information.

2. The method according to claim 1, wherein the two pieces of account information having common features comprises at least one of:
the two pieces of account information having an interaction behavior;
the two pieces of account information being bound to a same object; or
the two pieces of account information being logged-in on a same device.

3. The method according to claim 1, further comprising:
extracting the account information bound to the target identity information from the user data in response to the determined risk value being greater than the specified threshold, and screening the suspicious account information out from the account information bound to the target identity information.

4. An apparatus for identifying identity information, comprising:
a processor; and
a memory storing instructions executable by the processor, wherein the processor is configured to:
acquire user data from a server of a website, the user data comprising identity information and account information of a user;
based on a computer-implemented relationship diagram, establish an association relationship between account information and identity information that are bound in the user data, and establish an association relationship between two pieces of account information having common features in the user data, wherein establishing the association relationship comprises establishing the relationship diagram corresponding to the user data, wherein the relationship diagram comprises an identity node for representing the identity information in the user data and account nodes for representing the account information in the user data, and the relationship diagram comprises a connection line between an account node and the identity node that are bound, and a connection line between two account nodes having common features;
determine a risk value of target identity information in the user data according to the established association relationships, and compare the determined risk value with a specified threshold;
in response to the determined risk value being greater than the specified threshold, determine, for current account information in account information bound to the target identity information, an authentication device corresponding to the current account information; and
determine a quantity of accounts authenticated in the authentication device, and in response to the determined quantity of accounts authenticated in the authentication device being greater than or equal to a specified quantity threshold, determine the current account information as suspicious account information;
wherein among paths connecting a first account node and a second account node in the relationship diagram, a path comprising fewest connection lines is used as a shortest path between the first account node and the second account node; and the processor is further configured to:
count, in the established relationship diagram, a number of shortest paths where a target identity node representing the target identity information is located, and count a total number of shortest paths in the relationship diagram; and determine a ratio of the number of the shortest paths where the target identity node is located to the total number of the shortest paths in the relationship diagram as the risk value of the target identity information.

5. The apparatus according to claim 4, wherein the processor is further configured to:

extract the account information bound to the target identity information from the user data in response to the determined risk value being greater than the specified threshold, and screen the suspicious account information out from the account information bound to the target identity information.

6. The apparatus according to claim 4, wherein the two pieces of account information having common features comprises at least one of:

the two pieces of account information having an interaction behavior;

the two pieces of account information being bound to a same object; or the two pieces of account information being logged-in on a same device.

7. A non-transitory computer-readable storage medium having stored therein instructions that, when executed by a processor of a device, cause the device to perform a method for identifying identity information, the method comprising:

acquiring user data from a server of a website, the user data comprising identity information and account information of a user;

based on a computer-implemented relationship diagram, establishing an association relationship between account information and identity information that are bound in the user data, and establishing an association relationship between two pieces of account information having common features in the user data, wherein the establishing the association relationship comprises establishing the relationship diagram corresponding to the user data, wherein the relationship diagram comprises an identity node for representing the identity information in the user data and account nodes for representing the account information in the user data, and the relationship diagram comprises a connection line between an account node and the identity node that are bound, and a connection line between two account nodes having common features;

determining a risk value of target identity information in the user data according to the established association relationships, and comparing the determined risk value with a specified threshold;

in response to the determined risk value being greater than the specified threshold, determining, for current account information in account information bound to the target identity information, an authentication device corresponding to the current account information; and determining a quantity of accounts authenticated in the authentication device, and in response to the determined quantity of accounts authenticated in the authentication device being greater than or equal to a specified quantity threshold, determining the current account information as suspicious account information;

wherein among paths connecting a first account node and a second account node in the relationship diagram, a path comprising fewest connection lines is used as a shortest path between the first account node and the second account node; and the determining the risk value of target identity information in the user data comprises:

counting, in the established relationship diagram, a number of shortest paths where a target identity node representing the target identity information is located, and counting a total number of shortest paths in the relationship diagram; and determining a ratio of the number of the shortest paths where the target identity node is located to the total number of the shortest paths in the relationship diagram as the risk value of the target identity information.

* * * * *